Figure 1:
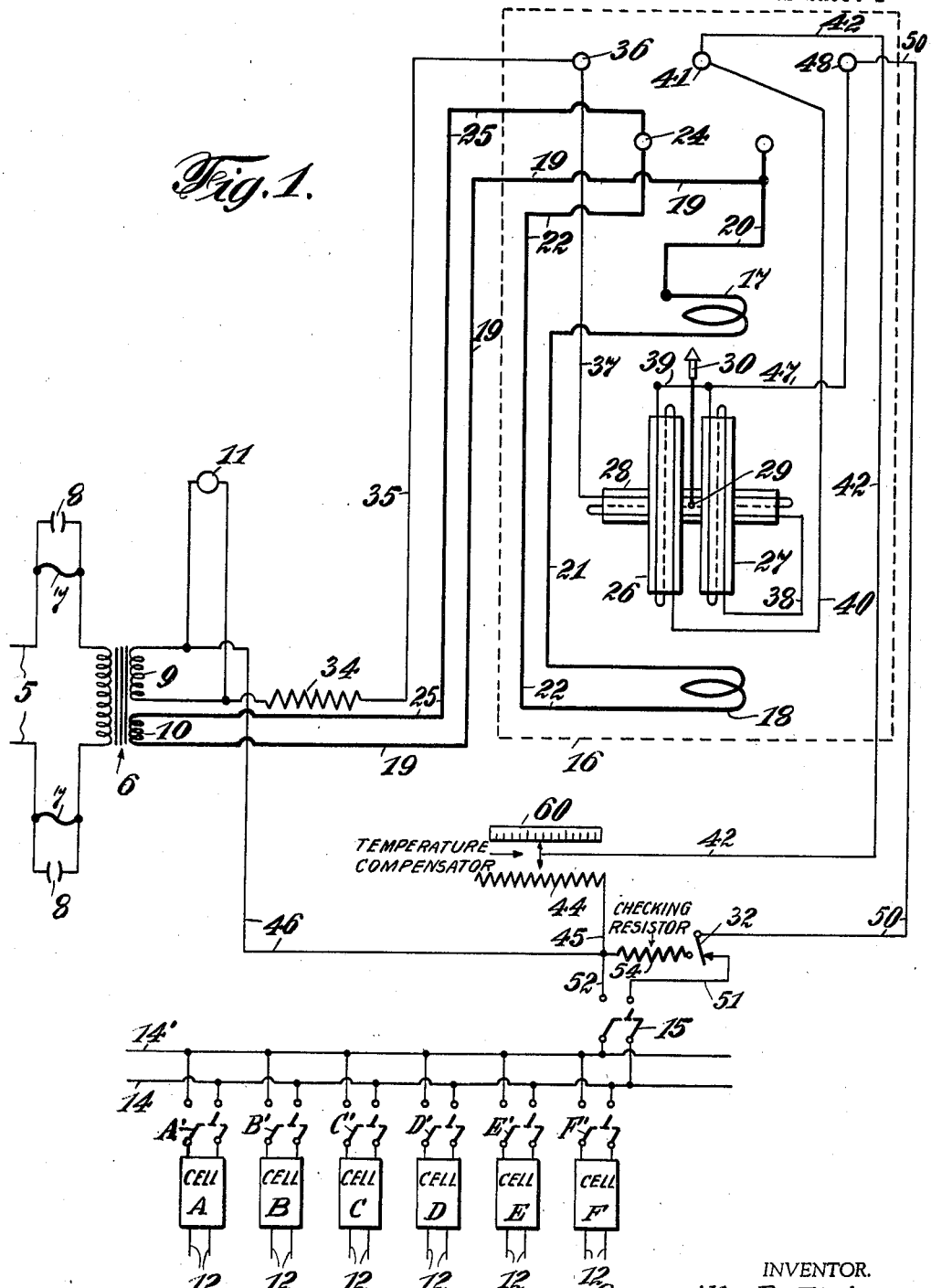

Dec. 29, 1942.    G. B. ELLIS    2,306,691
APPARATUS FOR MEASURING SALINITY
Filed Aug. 1, 1940    2 Sheets-Sheet 2

INVENTOR.
Grenville B. Ellis
BY Ramsey, Kent, Chisholm & Lutz
his ATTORNEYS

Patented Dec. 29, 1942

2,306,691

UNITED STATES PATENT OFFICE 2,306,691

APPARATUS FOR MEASURING SALINITY

Grenville B. Ellis, Rockville Centre, N. Y., assignor to Control Instrument Company, Inc., Brooklyn, N. Y., a corporation of New York Application August 1, 1940, Serial No. 349,354

3 Claims. (Cl. 175—183)

This invention relates to apparatus for electrically measuring the salinity of water, such apparatus being especially useful on ships at sea.

On shipboard, sea water is used for cooling condensers, etc., and is sometimes distilled to replenish fresh water supplies. Thus, the sea water is conducted into proximity to the fresh water system at various points on the ship; and through leakage or failure of equipment to function properly, the feed water for the boilers and other fresh water on the ship may become contaminated with sea water. Therefore it is desirable to have means for quickly and readily testing the fresh water at various selected points in the fresh water system, to the end that the salinity of the fresh water may be kept satisfactorily low, and also to the end that any leakage of sea water into the fresh water system be promptly detected and located.

Salinity-measuring apparatus has been used heretofore for such purposes. In what is probably the most satisfactory form previously known, it comprises various testing cells distributed throughout the fresh water system and so arranged that they are contacted by, or acted upon, by the fresh water. Each of these cells ordinarily includes a pair of spaced electrodes between which the fresh water acts as an electrolyte or conductor. Circuits and switches are used to selectively connect each of the cells with a meter system so arranged that a potential is applied to the two electrodes of the cell and the resulting current is measured by a meter. The greater the salt content of the water, the higher its conductivity, and the higher the current that flows to the meter. This permits calibration of the meter in terms of grains of sea salt per gallon of water. Because the conductivity of the water also varies with temperature, compensating or correcting means are employed in the apparatus to eliminate the effect of temperature in the resulting reading of the meter.

It is desirable to energize the testing apparatus from the ship's source of alternating current supply, and such a source is apt to vary both in voltage and frequency. However, the electrical meter is provided with an air core alternating current field in which is pivotally mounted a moving system consisting of two air core coils mechanically fixed in quadrature; and such a meter is properly responsive to alternating current without variation due to reasonable changes in voltage or frequency. One of the coils is a holding coil which is constantly energized and biases the meter to zero position. Energization of the quadrature coil in response to current flowing through the testing cell causes deflection of the meter to indicate the salinity.

With this prior art apparatus the amount of meter deflection possible is necessarily less than 90°, thereby correspondingly limiting the accuracy and readability of the meter. Additionally, as a moving coil approaches the position in which it embraces the maximum field flux, the torque of the coil falls off. In the aforesaid prior art system, this results in low torque at both ends of the scale, with corresponding insensitiveness of the meter at both low and high readings. This insensitiveness at low readings may result in failure to detect in the earlier stages the leakage of sea water into the fresh water system.

A general object of the present invention is to provide salinity measuring apparatus of increased sensitiveness and improved performance.

Another object of the invention is to provide salinity measuring apparatus having a meter the torque of which is relatively high at the ends of the scale.

A further object of the invention is to provide electric salinity measuring apparatus in which the possible deflection is substantially more than 90°, to the end that the scale may be lengthened, or in lieu thereof, that the more accurate portion of the possible scale be utilized in the measuring instrument.

Fig. 1 of the drawings is a schematic diagram showing salinity measuring apparatus embodying the present invention.

Figure 2:
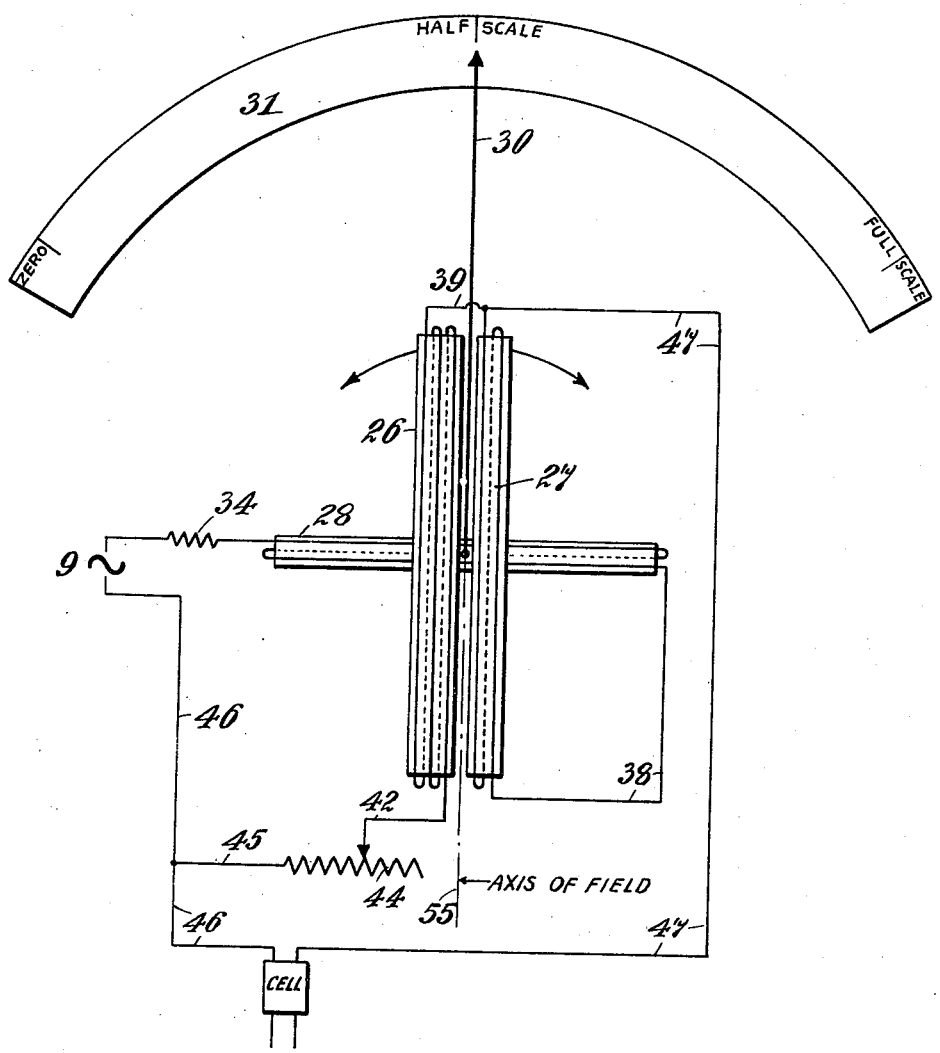

Fig. 2 is a simplified schematic diagram of the meter and circuit shown in Fig. 1, on an enlarged scale.

Alternating current is delivered over conductors 5 to the primary of transformer 6. Each of the conductors 5 is fused at 7 and provided with an indicator 8 (e. g. a neon lamp) to indicate when a fuse is blown. Transformer 6 is provided with a secondary 9 of relatively high voltage (e. g. 110 to 120 volts), and another secondary 10 of relatively low voltage (e. g. 15 volts). Connected across secondary 9 is a pilot lamp 11 which indicates that the apparatus is energized ready for operation.

Cells such as A to F inclusive are distributed throughout the fresh water system with their projecting spaced electrodes 12, 12 in contact with the water. By means of the switches A' to F' inclusive any chosen cell may be connected across bus wires 14, 14'. A switch 15 serves to include the bus wires 14, 14' (and any cell connected across the bus wires) into a circuit, which will be described later.

An electric meter 16 has air core field coils 17 and 18 which are energized from transformer secondary 10 via conductor 19, conductor 20, coil 17, conductor 21, coil 18, conductor 22, terminal 24, and conductor 25 back to transformer secondary 10. Pivotally mounted in the field produced by coils 17 and 18 is a springless, air core moving system comprising physically parallel coils 26 and 27 and a third coil 28 at right angles to each of the coils 26 and 27. All three of these coils are rigidly connected together and they are pivoted at 29 to turn as a unit and thereby move pointer 30 over scale 31. (Fig. 2.)

Coils 26, 27 and 28 are all connected in series to be energized from transformer secondary 9, and this series circuit also includes a variable temperature-compensating resistance 44. The circuit is from transformer secondary 9, line resistor 34, conductor 35, terminal 36, conductor 37, the winding of coil 28, conductor 38, the winding of coil 27, conductor 39, the winding of coil 26, conductor 40, terminal 41, conductor 42, temperature compensating resistor 44, conductor 45, and conductor 46 back to secondary 9. The coils 27 and 28 are also arranged to be included in a second series circuit which additionally includes any one of the cells A to F inclusive. Suppose switches A' and 15 to be closed, while switches B', C', D', E', and F' are open, and switch 32 is in the position shown in the drawings. Then there is a circuit from transformer secondary 9, line resistor 34, conductor 35, terminal 36, conductor 37, the winding of coil 28, conductor 38, the winding of coil 27, conductor 47, terminal 48, conductor 50, switch 32, conductor 51, the right-hand leg of switch 15, bus wire 14, right-hand leg of switch A', cell A, left-hand leg of switch A', bus wire 14', left-hand leg of switch 15, conductor 52, and conductor 46 back to transformer secondary 9.

By opening switch A' and closing any of the other switches B' to F', any of the other cells may be substituted in the circuit for cell A. Also by opening switch 15 and shifting switch 32 to its alternative position, checking resistor 54 may be substituted into the circuit in lieu of one of the cells A to F inclusive. This resistor has a definite fixed resistance equal to the correct resistance of one of the cells A to F at a predetermined salinity and temperature. By substituting resistor 54 into the circuit from time to time the operation of the apparatus may be checked. If everything is in order, the reading of the meter will then be a definite predetermined value.

The operation of the apparatus will best be seen from Fig. 2. This figure is simplified by omitting everything except the bare electrical essentials and by including a single one of the cells A to F into the circuit. In lieu of showing the field coils 17 and 18, the axis of the field is indicated by line 55.

The temperature compensating resistor 44 is so arranged that it cannot be adjusted to infinite resistance, i. e., it will always pass some current. Suppose that the water which is in contact with the cell has no saline content, with the result that the cell passes no current. Then the only current flowing is in the circuit from source 9, line resistor 34, the winding of coil 28, conductor 38, the winding of coil 27, conductor 39, the winding of coil 26, conductor 42, temperature compensating resistor 44, conductor 45, and conductor 46, back to source 9. Each of the three coils 26, 27 and 28 tends to move into such position that it embraces the maximum flux of the field. Since the coils are mechanically connected together, they cannot move separately, but all three coils have to move as a single system. This results in the moving system (and hand 30) taking up a position which is a resultant of the turning forces exerted by the three coils. The connections and windings of the field coils and the respective armature coils are in such directions that coil 28 tends to assume the position shown in Fig. 2, while coil 26 tends to turn counter-clockwise to a position at right angles to that shown in Fig. 2 and coil 27 tends to turn clockwise to a position at right angles to that shown in Fig. 2. Coil 26 has a greater number of turns than coil 27, and therefore, the deflecting force of coil 26 is greater than that of coil 27 when the same current is flowing in these two coils. Thus, under the circuit conditions just traced, the counter-clockwise effort of coil 26 overbalances the clockwise effort of coil 27 and the system turns counter-clockwise in opposition to the tendency of coil 28 to stay in the mid-scale position shown in Fig. 2. This results in the needle or pointer 30 coming to zero position on the scale, the relative strength of the coils being so proportioned as to produce this result.

Now suppose that the cell becomes slightly conducting. Then an additional current flows through coils 27 and 28 via a circuit from source 9, line resistor 34, the winding of coil 28, conductor 38, the winding of coil 27, conductor 47, the cell, and conductor 46 back to source 9. This additional current in the coils 27 and 28 increases the torque of those coils. Toil 28 tends more strongly to swing to the mid-scale position, and coil 27 tends more strongly to move clockwise to a position at right angles to that shown in Fig. 2. Furthermore, the additional current increases the voltage drop in line resistor 34, thereby diminishing to some extent the current in coil 26. Accordingly, the counter-clockwise torque of coil 26 falls off to some extent. Therefore, the resultant effect on the moving system of the meter is to advance the needle or pointer 30 from zero toward the half scale position.

As the current through the cell continues to increase, the clockwise torque of coil 27 also continues to increase (while the counter-clockwise torque of coil 26 continues to decline), so that there comes a time when the clockwise effort of coil 27 exactly balances the counter-clockwise effort of coil 26. In this condition, coil 28 then aligns itself with the field flux, placing the needle or pointer 30 in the half scale position. With a further increase in the conductivity of the cell, the current through coil 27 increases still further, with the result that the clockwise turning effort of coil 27 becomes even greater than the counter-clockwise effort of coil 26. Accordingly, the needle or pointer is advanced from half scale position toward full scale position.

It will be noted that coil 28 biases the moving system of the meter to the mid-scale position, and that when the torque of coil 26 exceeds that of coil 27 the moving system of the meter positions itself in the quadrant to the left of the mid-scale position, while when the torque of coil 27 exceeds that of coil 26 the moving system of the meter positions itself in the quadrant to the right of the mid-scale position. By utilizing each of these quadrants to the extent of more than 45° each, the entire scale of the meter can be extended to considerably beyond 90° if desired. If the greater part of each of these quadrants be utilized the coils 26 and 27 will, at the ends of the scale, move into positions where each increment of movement results in only a relatively small change in the amount of field flux embraced by these coils; and this means that the meter is relatively insensitive under these scale conditions. Accordingly, I prefer to limit the length of the scale and thereby have the ends of the scale in such a range that the coils 26 and 27 will, at the end of the scale, be in positions where increments of movement of these coils result in relatively large changes in the amount of field flux embraced by these coils. This provides the moving system with relatively high torque at the ends of the scale, thereby giving the measuring system desirable sensitivity at low scale and high scale positions of the needle. This insures detection, in the early stages, of any contamination of the fresh water with sea water.

For water to a given saline content, the conductivity increases with temperature. Thus, corrections should be made for the effect of temperature. This is done by temperature compensating resistor 44, with which there may be a cooperating temperature scale 60 (Fig. 1). By adjusting the temperature compensator to diminish the portion of resistance 44 in the circuit, the current flowing through coil 26 is increased. This increases the counter-clockwise turning effort of coil 26, thereby compensating for that increase of current in coil 27 which is due to an increase in temperature of the water rather than an increase in salinity. Preferably the scale 60 is marked directly in terms of temperature, the entire system being calibrated by immersing the cell in an actual water bath whose temperature and saline content is varied and the necessary scale data thereby obtained for temperature scale 60 and meter scale 31. Preferably meter scale 31 is marked directly in terms of grains of sea salt per gallon of water.

It will be apparent that various operating characteristics can be imparted to the apparatus by varying the number of turns of the moving coils and varying the resistance of the various circuit elements. In one actual embodiment that I have used the resistances were approximately as follows: resistor 34, 1420 ohms; temperature compensating resistor 44, 5390 ohms; coil 27, 125 ohms; coil 28, 65 ohms; coil 26, 325 ohms. Often it may be convenient to bring the coils 26, 27 and 28 to the desired resistance by means of inserting fixed resistances outside of the windings themselves. In this same embodiment of the invention which I have used coil 26 had 540 turns while coils 27 and 28 each had 270 turns. The greater number of turns of coil 26, as compared to coil 27 is one way of giving coil 26 a greater turning force per unit of current. A similar result could be accomplished by making coil 26 of greater cross sectional area than coil 27 so that it would thereby embrace a greater amount of the field flux.

In compliance with the patent statute I have disclosed the best form in which I have contemplated applying my invention. It will be realized, however, that the disclosure is illustrative, rather than limiting, and that various modifications and arrangements may be made within the scope of the invention.

I claim:
1. In apparatus for electrically measuring the salinity of water, the apparatus including circuit connections, a cell to pass current varying with the salinity, a plural coil moving system having at least one coil connected to receive an energizing current varying with the current passed by said cell, and means to establish an electromagnetic field with which the moving system reacts to produce a deflection that is a measure of the salinity; the improvement which comprises: the moving system having two coaxial coils and having a third coil whose axis is perpendicular to that of the first two coils, all three of said coils of the moving system being connected in a series circuit to be energized with a current independent of the current passed by said cell, a variable impedance being also included in said series circuit, and the circuit connections providing an additional circuit to pass the cell current through two of said coils of the moving system whose axes are perpendicular.

2. In apparatus for electrically measuring the salinity of water, the apparatus including circuit connections, a cell to pass current varying with the salinity, a plural coil moving system having at least one coil connected to receive an energizing current varying with the current passed by said cell, and means to establish an electromagnetic field with which the moving system reacts to produce a deflection that is a measure of the salinity; the improvement which comprises: the moving system having two coaxial coils differing as to their number of turns and having a third coil whose axis is perpendicular to that of the first two coils, all three of said coils of the moving system being connected in a series circuit to be energized with a current independent of the current passed by said cell, a variable impedance being also included in said series circuit, and the circuit connections providing an additional circuit to pass the cell current through said third coil and the one of said two coils which has the lesser number of turns.

3. In apparatus for electrically measuring the salinity of water, the apparatus including circuit connections, a cell to pass current varying with the salinity, a plural coil moving system having at least one coil connected to receive an energizing current varying with the current passed by said cell, and means to establish an electromagnetic field with which the moving system reacts to produce a deflection that is a measure of the salinity; the improvement which comprises: the moving system having a first coil, a second coil coaxial therewith and of double the number of turns; and a third coil of the same number of turns as the first coil and whose axis is perpendicular to that of the first coil; all three of said coils of the moving system being connected into a series circuit to be energized with a current independent of the current passed by said cell; a temperature-compensating variable resistance being also included in said series circuit; and the circuit connections providing an additional circuit to pass the cell current through said first and third coils.

GRENVILLE B. ELLIS.